Sept. 22, 1964    N. SISSENWINE ETAL    3,149,491
AIRBORNE JET STREAM DETECTOR

Filed July 5, 1961    3 Sheets-Sheet 1

INVENTORS
NORMAN SISSENWINE
ROBERT LEVITON
AND CHARLES F. CAMPEN JR.
BY

ATTORNEYS

Sept. 22, 1964    N. SISSENWINE ETAL    3,149,491
AIRBORNE JET STREAM DETECTOR
Filed July 5, 1961    3 Sheets-Sheet 2
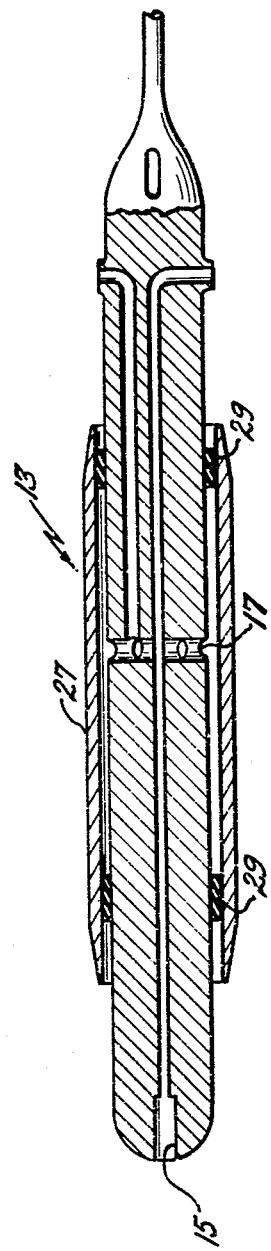
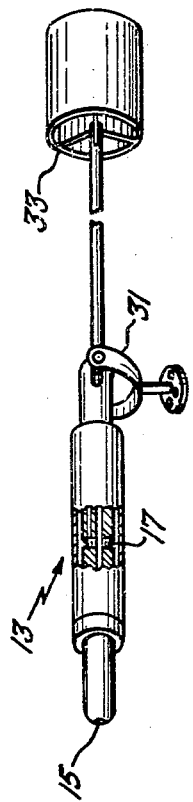
INVENTORS
NORMAN SISSENWINE
ROBERT LEVITON
AND CHARLES F. CAMPEN Jr.
BY
ATTORNEYS

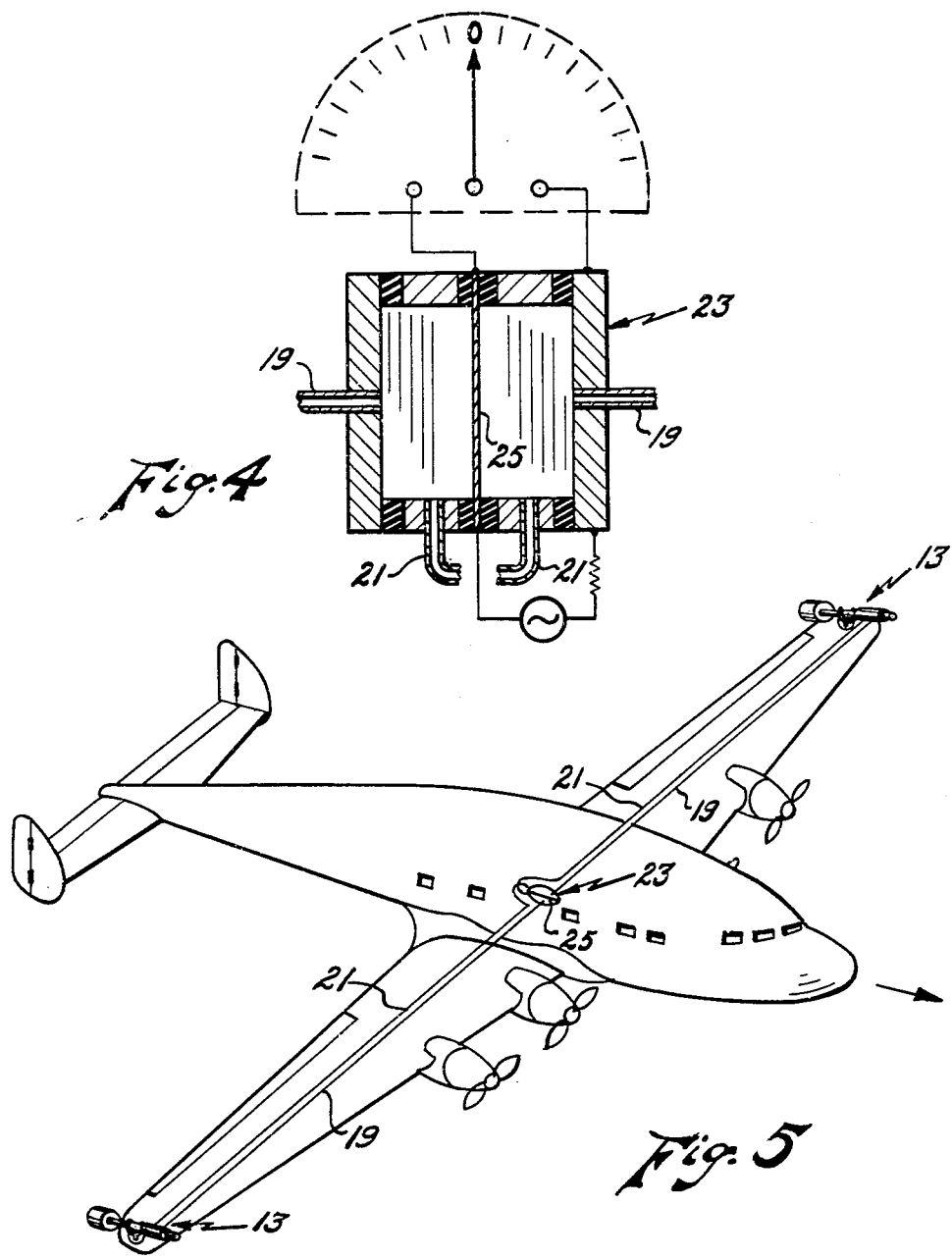

3,149,491
AIRBORNE JET STREAM DETECTOR
Norman Sissenwine, Natick, and Robert Leviton, Framingham, Mass., and Charles F. Campen, Jr., Pasadena, Calif., assignors to the United States of America as represented by the Secretary of the Air Force
Filed July 5, 1961, Ser. No. 122,039
3 Claims. (Cl. 73—178)
(Granted under Title 35, U.S. Code (1952), sec. 266)

The invention described herein may be manufactured and used by or for the United States Government for governmental purposes without payment to us of any royalty thereon.

This invention relates to a flight instrument for locating the jet stream and is more particularly concerned with providing a means for measuring wind shear or air speed variation across the wing span of aircraft in flight, thereby determining the direction of the jet stream axis and using the jet stream advantageously to add to the ground speed of the aircraft.

The jet stream is a current of air in the atmosphere very closely resembling an ocean current. It occasionally completely encircles the globe in the Northern Hemisphere but is generally broken in a number of points. It is a regular feature in the circulation of the atmosphere, although at times not too well developed and recognizable. During periods of reasonably straight westerly flow it often becomes extremely narrow and strong, reaching its maximum intensity at an altitude of thirty to forty thousand feet where the winds sometimes exceed 300 miles per hour, rapidly decreasing north and south of its axis. This decrease in speed across the jet stream, called the horizontal shear, has generally been considered fairly uniform and approaching a maximum of 150 miles per hour per 100 miles. However, research flights have been conducted which indicate fluctuations in the wind speed gradients resulting in shears of many times this amount.

Since the discovery of the jet stream navigators and pilots have been attempting to devise a method by which they could guide their aircraft down the jet in a manner analogous to flying a heading with an ordinary compass. The development of such a technique will, in a moderately well-developed jet stream, enable aircraft flying at altitudes of thirty to thirty-five thousand feet to add 50 to 100 miles per hour to their ground speeds by flying a course near the jet axis, considerably reducing the time and cost of the flight. These increases in speed will be even greater when flying in an extremely well developed jet stream or when a proportionally greater shift toward the jet axis is made. Less spectacular but still substantial advantages will be found for flights in or near jet streams of lesser strength.

Accordingly, it is an object of the present invention to provide an aircraft in flight with means for detecting and locating the axis of the jet stream in order to take full advantage of the prevailing winds therein.

Another object of the invention is to provide means for measuring the wind shear in the area of the jet stream by measuring and comparing the average air speed of one point on the aircraft with that of another remotely located point thereby determining the point which encounters the higher air speed indicating the direction of the jet stream flow.

Still another object of the invention is to provide an aircraft with a pair of Pitot-static tubes, one on the outer tips of each of the wings, and means for measuring and comparing the relative air speed as determined by these tubes.

A further object of the invention is to provide an instrument which measures and compares the relative air speed at different points in a carrying aircraft and includes a built-in-time lag to prevent sensitivity to small scale turbulence found in the area of wind shear and allow only the real air speed differences to register on the meter portion of the instrument.

A still further object of the invention is to provide instrument pick-up heads which are self-aligning and remain parallel to each other during flight of the carrying aircraft. A three-dimensional swivel arrangement and guard cylinder prevents the introduction of extraneous dynamic pressure into the static heads by retaining the pick-up heads in parallel relationship with each other.

Another still further object of the invention is to provide a flight instrument having a meter portion which includes automatic compensation for pressure gradient by conducting the static pressure force into opposite sides of a sensitive diaphragm thereby serving to cancel the overall effect thereof, the resultant meter reading being the difference between the dynamic pressures only.

Other important features of the invention described herein include the provision of a device which would indicate to the pilot or navigator of an aircraft the exact location of the jet stream axis by indicating zero on a meter in the cockpit of the aircraft. Any deviation to the right or left of the jet axis will indicate on the meter allowing the pilot to change course and remain in the jet stream.

These and other objects, features, and advantages will become more apparent from the following description when considered in conjunction with the accompanying drawings in which like numbers refer to like parts in the different views wherein:

FIG. 2 is a detailed view, partly in section, showing one of the Pitot-static pick-up tubes;

FIG. 3 is a view of one Pitot-static tube showing the three-dimensional swivel arrangement for mounting on the carrying aircraft to retain the tubes in parallel alignment with one another;

FIG. 4 is a schematic view of the meter portion of the flight instrument showing the capacitance measuring circuit actuating an electrical meter calibrated in dynes/$cm.^2$; and FIG. 5 is a view showing the jet stream detector operatively mounted on the carrying aircraft.

Figure 1:
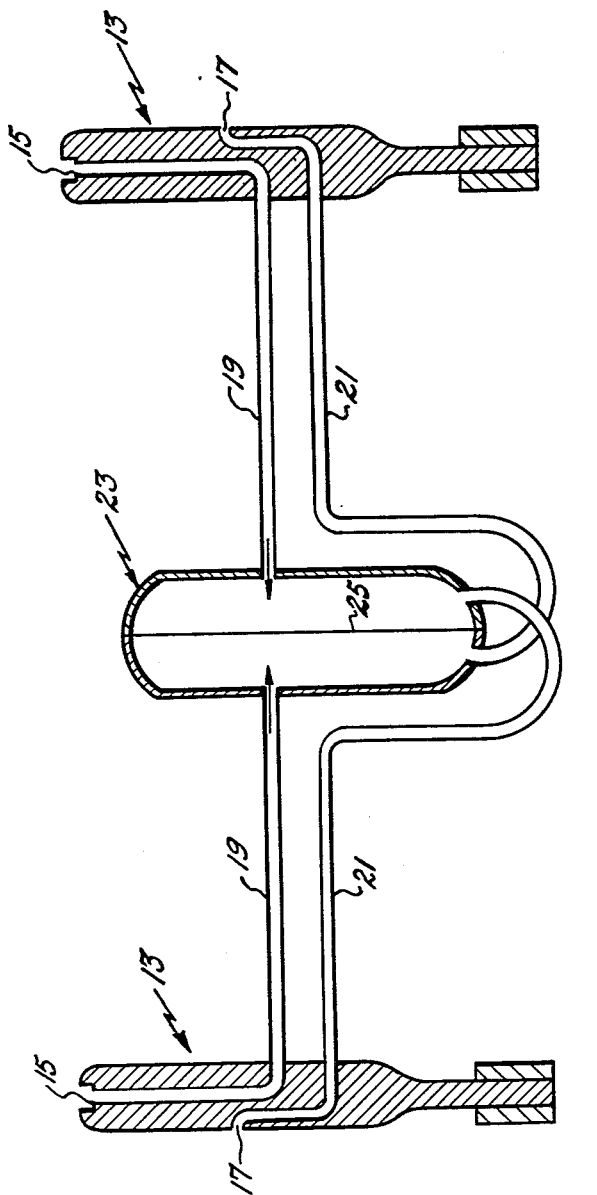
FIG. 1 is a diagrammatic view showing pressure measuring and comparing apparatus embodying the invention.

Referring to the drawings, FIG. 1 schematically shows a pair of Pitot-static tubes 13 having the opening 15 located in their forwardmost section to allow the unimpeded entrance of air thereinto. The air which enters the opening 15 is under dynamic or impact pressure caused by the fast movement of the vehicle upon which the Pitot tube 13 is mounted as well as the air current movement in the area near the opening 15. Another opening 17 is provided for receiving air under static pressure. Because the opening 17 is located on the side of the Pitot tube, it is unaffected by the vehicle speed or wind conditions. A protective cover may be placed over the entrance area so that only the pressure changes due to altitude considerations would be effective. The Pitot-static tubes 13 would normally be placed on the wing tips of the carrying aircraft.

The opening 15 for receiving the dynamic pressure and the opening 17 for receiving the static pressure are each provided with separate conduits 19 and 21 respectively for conducting the air pressures received inwardly toward the central portion of the aircraft. The other ends of the conduits 19 and 21 are connected to a sensitive manometer 23 having a diaphragm 25 movable in response to changes in pressure. The static pressures as received through the openings 17 and communicated to the manometer 23 through the conduits 21 are introduced into opposite sides of the diaphragm 25, from the corresponding dynamic pressures conducted to the manometer 23 by the conduits 19. This arrangement automatically compensates for errors due to the static pressure difference or pressure gradient. This resulting effect is a cancelling of the static pressures causing the movement of the diaphragm 25 to be due entirely to the difference between the dynamic pressures at each wing tip. This can be shown by the equation:

$$(P+p')-(P'+p)=(q+p+p')-(q'+p'+p)=q-q'$$

where $P$=total pressure
$q$=dynamic pressure
$p$=static pressure

The difference between the dynamic pressures at respective wing tips of a flying aircraft is of a relatively small order of magnitude. A pressure diaphragm capsule manometer in conjunction with an electrostatic indicator having a full scale deflection for a pressure of 3 dynes/cm.$^2$ and a sensitivity of less than 0.1 dyne/cm.$^2$ is available for use with the jet stream detector described herein. The schematic representation of the manometer and indicator is shown in FIG. 4.

Details of the forward portion of the Pitot-static tube 13 are shown in FIG. 2. A guard cylinder 27 is placed over the area adjacent to the static pressure inlet 17 and is held away from the tube body by the spacers 29. In FIG. 3 details of the complete Pitot-static tube 13 are shown. A rotatable trunnion mount 31 is utilized for attaching the tubes to the carrying aircraft. An arrangement of vanes 33 which function as aerodynamic tail fins are carried on the rearward portion of the Pitot-static tube. The trunnion mount 31 and vanes 33 serve to retain the dynamic intake opening 15 in proper alignment with the true direction of air flow at all times. These elements also retain the tubes in parallel alignment with each other so that the pressure differences can be properly interpreted by the manometer and electrostatic indicator.

FIG. 5 diagrammatically shows the jet stream detector operatively mounted on a carrying aircraft. The Pitot-static tubes 13 are mounted near each wing tip protruding forward into an area where the air stream is relatively undisturbed. As the aircraft flying in the downstream direction nears the jet stream, the tube toward the jet axis will encounter a lower pressure due to the wind shear effect. The dynamic pressures of the two tubes when compared by the sensitive manometer 23 will then indicate an unbalance on the needle of the electrostatic indicator. The amount of deflection would be proportional to the wind speed gradient as corrected for pressure-altitude. As the jet axis is approached, the amount of deflection is diminished until the needle reaches zero. If the pilot flies through or across the jet axis, the needle would deflect in the reverse direction indicating the proper heading taken by the navigator in order to again align the aircraft with the jet axis. The needle points toward the jet axis when flying downstream regardless of whether the aircraft is north or south of the jet axis. When flying upstream, the needle points away from the jet stream axis.

Thus, it can be seen that, where the identity of the wing tip encountering the higher air speed can be determined, the direction of the jet axis is immediately indicated. The difference in air speed between the two wing tips as measured according to the present invention, determines the gradient at which the wind speed increases toward the jet stream and would indicate the economy of shifting course. The direction of flight at which maximum difference in speed between wing tips is observed will be the direction of the jet stream flow.

It should also be noted that the air speed differences which exist on the average may often be concealed by small scale turbulence which is created in the area of wind shear. In the system described herein, there is a natural time lag present as a result of the physical placement of the tubes and manometer. In a typical installation, there may be a distance of 100 feet between the Pitot-static tubes requiring conduit members 50 feet long in order to reach the center portion of the aircraft. If ¼ inch tubing were used for each conduit, the time lag of the system could be about one minute. A distance of upward from 5 miles would be flown in that time, considerably greater than the dimensions anticipated for small scale turbulence, and errors resulting from normal oscillations about the horizontal and vertical axis would be eliminated.

Although our invention has been shown and described as to a single preferred embodiment, it will be apparent to one skilled in the art that certain changes, alterations, modifications, and substitutions can be made in the arrangement and location of the various elements without departing from the spirit and scope of the appended claims.

Having thus set forth and disclosed the nature of our invention, what we claim is:

1. An aircraft instrument for determining the location of a jet stream, said instrument comprising a pair of air-pressure pick-up heads disposed equidistant outwardly from the central axis of a carrying aircraft, a self-aligning support means for mounting said pick-up heads on said aircraft, said support means being connected with each of said pick-up heads and said aircraft each of said pick-up heads comprising a first inlet for receiving air from an air stream under impact pressure and a second inlet positioned on said pick-up head for receiving air under static pressure, said second inlets being provided with guard means to prevent the entrance of air under impact pressure thereinto, means for conducting the air from each of the inlets of said pick-up heads toward a central area, the conductor means conducting the air from the first inlet of the first of said pick-up heads being operatively joined to the conductor means conducting the air from the second inlet of the second of said pick-up heads and the conductor means conducting the air from the first inlet of the second of said pick-up heads being operatively joined to the conductor means conducting the air from the second inlet of the first of said pick-up heads, and means at said central area for comparing the air from said operatively joined conductor means to determine the relative pressure differential between each of said pick-up heads.

2. An aircraft instrument for determining the relative velocity of different portions of an air stream through which an aircraft is passing, said instrument comprising a pair of air-pressure pick-up heads disposed equidistant outwardly from the central axis of said aircraft, a self-aligning support means for mounting said pick-up heads on said aircraft, each of said pick-up heads comprising a first inlet for receiving air from an air stream under impact pressure and a second inlet positioned on said pick-up head for receiving air under static pressure, said second inlet being provided with guard means to prevent the entrance of impact air-pressure thereinto, tubing means for conducting the air entering each of said inlets to a central area in said aircraft, each of said inlets having a separate conducting tube attached thereto, a manometer located at said central area for receiving and comparing the air from said inlets, said manometer comprising a pressure sensitive diaphragm serving to separate the manometer capsule into two pressure tight compartments, the first of said compartments being arranged to receive the air from the first inlet of the first of said pair of pick-up heads and the second inlet of the second of said pair of pick-up heads, the second of said compartments being arranged to receive the air from the second inlet of the first of said pair of pick-up heads and the first inlet of the second of said pair of pick-up heads, said diaphragm moving in response to the pressure differential between the air entering the first inlets of each of the pick-up heads, the effect of the air under static pressure received from the second inlets serving to automatically compensate for any static pressure gradient, the resultant movement of said diaphragm being due to the difference in impact pressure between the pick-up heads and operating to drive an instrument for indicating the location and direction of a jet stream.

3. The instrument defined in claim 2 wherein the tubing means for conducting air to the manometer is constructed and arranged to provide a time lag between entrance of air in the inlets and receipt of air by the manometer, said time lag serving to prevent small scale air turbulence from adversely affecting the operation of said manometer and associated indicating instrument driven thereby.

References Cited in the file of this patent

UNITED STATES PATENTS

| | | |
|---|---|---|
| 2,113,528 | Reuter | Apr. 5, 1938 |
| 2,770,128 | Moses | Nov. 13, 1956 |
| 2,936,617 | Beebe | May 17, 1960 |

FOREIGN PATENTS

| | | |
|---|---|---|
| 736,086 | France | Nov. 18, 1932 |